Patented May 19, 1953

2,639,259

UNITED STATES PATENT OFFICE 2,639,259

INSECTICIDES

Richard H. Wellman, Yonkers, N. Y., and Raymond W. McNamee, Charleston, W. Va., assignors, by mesne assignments, to Union Carbide and Carbon Corporation, a corporation of New York No Drawing. Application July 20, 1948,
Serial No. 39,811

18 Claims. (Cl. 167—22)

This invention relates to insecticides, the materials finding particular use as fly repellents on animals and as toxicants for mites, scale insects, aphids and the like on plants.

The materials to which the present disclosure is addressed are butoxy polypropylene glycols with viscosities between 100 and 850 Saybolt Universal seconds at 100° F. and average molecular weights between 400 and 2200. These materials are of the formula

$$C_4H_9—(OC_3H_6)_nOH$$

where $n$ is from 6 to 35. They are distinguished from the polyglycols as a class by the association of a single butoxy group with from 6 to 35 propylene oxide groups. The substitution of higher or lower molecular weight saturated alkoxy groups for the butoxy groups renders the materials less satisfactory as does the substitution of other groups for the propylene oxide group or the use of a greater or smaller number of propylene oxide groups.

Fly repellents for use on animals must be efficient in preventing bites from various flies which attack animals and must possess the ability of remaining on the animal for long periods of time. The repellent should protect the animal from the insect pests for a period of at least one day and ideally several days and it must be able to withstand adverse effects of weathering such as sun, rain, and temperature, and habits of the animal such as rolling in wet grass or in dry earth or rubbing against one another. Furthermore, a material which is to be in intimate contact with all parts of the animal body for long periods of time must be relatively nontoxic, either by absorption through the skin or when the animal licks itself and it should not be irritating to the skin. A repellent preferably should keep the insects at a distance from the animal so the animal will not be bothered by the pests alighting or crawling over its body, but primarily it must prevent the insects from biting. A repellent may possess this latter property a long time after its distance effect has worn off. Annoyance from these factors and the loss of blood, in the case of cows, goats and the like, causes a loss in milk production and, in the case of meat animals, a loss in weight of the animal.

For use on plants against such pests as spider mites, aphids, scale and the like, the material should be toxic to all stages of the pests during their development from egg to adult. The material should possess residual toxicity for the insects, that is, be toxic to fresh infestations of the insects or be toxic to newly hatched larvae. The material must be resistant to varying weather conditions as sun, rain, and temperature changes. Furthermore, the chemical has to be nonphytotoxic to the plant at concentrations which are effective against insects. Chemicals used on food plants for control of insect pests should not leave residues, either on the surface of the vegetation or absorbed or stored in the vegetation, that are toxic to animals or humans.

The materials disclosed herein have these properties and they are characterized by a low water solubility, less than 0.4 part by weight of the 400 molecular weight material being soluble in 100 parts of water and less than 0.01 part of the 2200 molecular weight material being thus soluble, at 30° C. The materials are also characterized by boiling points above 400° F., a vapor pressure below $1\times10^{-2}$ mm. Hg at 30° C. for the 400 molecular weight material and below $1\times10^{-4}$ for the 2200 molecular weight material; such chemical stability that they do not decompose upon storage of at least three years or under the conditions of use upon the plants or animals; solubility for other common insecticides and fungicides, used as addends, for instance dichlorodiphenyltrichloroethane (DDT), gamma benzene hexachloride, "Toxaphene" (a chlorinated bicycloterpene with the empirical formula $C_{10}H_8Cl_8$), "Chlordane" (1,2,4,5,6,7,8,8' - octachloro - 4,7 - methano - 3a,4,7,7a - tetrahydroindane with the empirical formula $C_{10}H_6Cl_8$), phosphorus compounds as hexaethyl tetraphosphate, tetraethyl pyrophosphate, o,o' diethyl para nitrophenol thiophosphate, mineral oils, pyrethrins, derris extracts, cyanates as thiocyanates, phthalates as dimethyl phthalate, dibutyl phthalate, di-octyl phthalate, di-2-ethylhexyl phthalate, condensation products of mesityl oxide oxalates as n-butyl mesityl oxide oxalate, hexanols as 2-phenyl cyclohexanol, 2-cyclohexyl cyclohexanol, glyoxalidines, particularly 2-heptadecyl glyoxalidine, the benzyl and phenyl ethers of ethylene glycol as well as the diol insect repellents disclosed in Wilkes U. S. Patent No. 2,407,205; and non-reactivity with such toxicants as lead arsenate, calcium arsenate and other inorganic salts.

A suitable and typical butoxy polypropylene glycol which has proven quite satisfactory for use on animals, humans, and plants has a viscosity of 250 Saybolt Universal seconds at 100° F., an average molecular weight of approximately 800, an average of 13 propylene oxide groups, a vapor pressure at 30° C. of $1 \times 10^{-3}$, a flash point of approximately 420° F., specific gravity $$\frac{20° C.}{20° C.}$$

of 0.990, and a water solubility of 0.1 part by weight in 100 parts of water. The material is oil-like, colorless to a light amber color when pure or substantially so, and dissolves and is soluble in common organic solvents as mineral oils, acetone, ethanol and dichlordifluormethane. When the undiluted material was applied to over two hundred humans in patch tests no primary irritation or sensitation was observed. The material is substantially nontoxic to warm-blooded animals; the single oral $LD_{50}$ dose for rabbits was 23.9 grams per kilogram. No unsightly residue could be observed either on plants, animals, humans or clothing after application at effective dosages.

In using the materials, they may be applied in undiluted form, as concentrates or in high dilution. They may be applied in undiluted form or as concentrates to animals, humans and clothing and, with the assistance of fog and similar apparatus, to trees and other plants as well as the other bases mentioned. Because of their effectiveness and to lessen costs and to facilitate distribution of the small amount of material necessary to obtain the desired results they are, as a practical matter, usually applied in admixture with a carrier. When used with carriers, either as concentrates or at high dilution, they may be applied as solutions, emulsions, suspensions, dusts or in any other suitable manner, with or without a wetting agent or other addend, for instance those previously mentioned. Liquid carriers may be water, mineral oils, organic solvents or other solvents or suspending agents; solid carriers may be talc, bentonite, diatomaceous earth, silica, pyrophyllite, fuller's earth, lime, gypsum or any other similar powder. For general use on humans and clothing, the material is usually applied in undiluted form or in solution in an unobjectionable solvent as ethanol, isopropanol or other alcohol; for general use on animals, the material is usually applied either as a water emulsion or as a solution in a light nontoxic mineral oil, for instance a kerosene (or lighter) fraction; for general use on plants, the material is usually applied either as a water emulsion or as a dust.

EXAMPLES OF COMPOSITIONS

*Example 1.*—An oil type of livestock spray is made by mixing from 5 to 25 parts by weight of the glycol with from 95 to 75 parts by weight of a light petroleum base oil, such as is commonly used in cattle sprays. The glycol and the oil are mutually soluble and a concentrate containing any quantity of the glycol may be prepared and used as such, or diluted with sufficient oil to bring the glycol content to as low as 3 parts in 100 parts of oil.

A typical base oil for livestock sprays has an initial boiling point (A. S. T. M. distillation) of 480° F. and a final boiling point of 690° F.; A. P. I. gravity of 39.5°; color, water-white; viscosity at 100° F., Saybolt Universal seconds, 42.7; pour point 25° F.; flash point, COC, 265° F.; and a bland, neutral taste. Lighter or heavier oils may be used.

*Example 2.*—A water-base type of livestock spray is made by mixing from 5 to 25 parts by weight of the glycol with from one-tenth part to 1 part by weight of an emulsifying agent and adding this mixture to sufficient water to give 100 parts by weight. A broad range of emulsifiers may be used as the glycol is easily emulsified in water. It is preferred to use no more emulsifier than is necessary to hold the emulsion during spraying. The amount of emulsifier to be used depends upon the efficiency of the emulsifier, the quantity of glycol to be held in suspension and whether or not the spray composition is agitated during use of the spray. Emulsifiers such as the mono- and di-oleates and stearates and other similar fatty acid derivatives of 200 to 600 viscosity polyethylene glycols are satisfactory emulsifying agents as are sodium lauryl sulfate, Triton X-100 (alkylated aryl polyether alcohol), Triton X-155 (dimeric alkylated aryl polyether alcohol), and Triton B-1956 (phthalic glycerol alkyd resin). A very good emulsion can be obtained with the sodium salt of 5,11-diethyl pentadecyl-8-sulfate as the emulsifying agent mixed in the proportion of 70 to 80 parts by weight of the 250 viscosity glycol and 30 to 20 parts by weight of the emulsifying agent, this mixture to be added to water to give the desired concentration of glycol. The emulsion is particularly effective against all stages of mites.

*Example 3.*—A stock spray containing DDT may be prepared by dissolving 1.5 parts of DDT in 10 parts of the glycol and then preparing the sprays as stated in Examples 1 and 2.

In one series of tests on livestock, one side of each of a number of cows (the "half cow test") was sprayed with about 55 cc. of a solution of a repellent in a light petroleum base oil commonly used in cattle sprays, similar to that previously identified. The other side of each cow was unsprayed. Every two hours, for six hours, counts were taken of the number of flies on the treated and untreated sides.

The percent repellency = $100 \times$ $$\frac{\text{(total flies on untreated side} - \text{total flies on treated side)}}{\text{total flies on untreated side}}$$

The flies on the cattle were predominantly stable flies, *Stomoxys calcitrans*, and horn flies, *Muscinae* spp. Solutions of 20 parts and of 5 parts by weight of the 250 viscosity glycol in 80 and 95 parts of the oil gave 89% and 92% repellency, respectively. A solution of 20 parts of n-butyl mesityl oxide oxalate, marketed under the name "Indalone," in 80 parts of the oil gave a repellency of 44%. Solutions of 20 parts and 5 parts of a terpene thiocyano ester, marketed under the name "Thanite," in 80 and 95 parts of the oil gave 83% and 74% repellency, respectively.

In another series of replicate tests on different herds of Guernsey cows against horn flies, certain cows were sprayed with various compositions and other (check) cows were unsprayed. In the tests, each treated cow was sprayed with 50 cc. of the composition assigned to it at 4:00 p. m. on the first day of the test. Counts were taken the following day and succeeding days throughout the test, beginning at 8:00 or 9:00 a. m. Fly counts were made every other hour until 5:00 p. m. Whenever any treated cow had 60 or more flies on it, 50 cc. of the spray was reapplied. The results of replicates 1 and 2 are shown on the following Tables 1 and 2, respectively.

*Table 1 (Replicate 1)*

| Composition | Duration of test, Days | Number of Sprays | Total No. of flies counted | Average No. of flies per day | Percent Reduction over check |
|---|---|---|---|---|---|
| A | 16 | 5 | 3,013 | 188 | 82 |
| B | 16 | 4 | 2,659 | 166 | 84 |
| C | 16 | 4 | 2,505 | 157 | 85 |
| D | 11 | 3 | 2,330 | 212 | 71 |
| E | 16 | 5 | 2,215 | 138 | 87 |
| F | 11 | 3 | 1,690 | 154 | 79 |
| G | 11 | 3 | 2,090 | 190 | 75 |
| None (check) | 16 | 0 | 16,513 | 1,032 | 0 |

*Table 2 (Replicate 2)*

| Composition | Duration of test, Days | Number of Sprays | Total No. of flies counted | Average No. of flies per day | Percent Reduction over check |
|---|---|---|---|---|---|
| A | 16 | 4 | 2,816 | 176 | 83 |
| B | 16 | 5 | 3,303 | 206 | 80 |
| C | 16 | 4 | 3,341 | 209 | 80 |
| D | 12 | 3 | 1,775 | 148 | 85 |
| E | 16 | 4 | 3,017 | 189 | 82 |
| F | 16 | 4 | 3,178 | 199 | 81 |
| G | 12 | 3 | 1,860 | 155 | 84 |
| None (check) | 16 | 0 | 16,639 | 1,040 | 0 |

Composition A was 10 parts by weight of butoxy polypropylene glycol of 100 viscosity and 90 parts by weight of a spray oil, similar to that previously described.

Composition B was 10 parts by weight of butoxy polypropylene glycol of 250 viscosity and 90 parts by weight of the spray oil.

Composition C was a water emulsion containing 10 parts by weight of the 250 viscosity glycol, 89 parts by weight of water and 1 part by weight of Triton X-100 used as an emulsifying agent.

Composition D was a water emulsion containing 10 parts by weight of the 250 viscosity glycol, 89 parts by weight of water and 1 part by weight of the dioleate of a polyethylene glycol having an average molecular weight of 600, used as an emulsifying agent.

Composition E was 10 parts by weight of the 250 viscosity glycol and 90 parts by weight of the spray oil containing 2 parts by weight of pyrethrum.

Composition F was 98 parts by weight of the spray oil and 2 parts by weight of pyrethrum.

Composition G was 10 parts by weight of the 250 viscosity glycol having dissolved therein 1.5% by weight of technical DDT, 1 part by weight of Triton X-100, and 89 parts by weight of water.

Percent reduction over untreated check =
$$100 \times \frac{\text{Total No. of flies on check} - \text{Total No. of flies on treated cow}}{\text{Total No. of flies on check}}$$

For practical livestock sprays, balancing costs of material against costs of application, the glycol should have a viscosity between 100 and 300 and be used in amounts from 4 to 15 parts with from 96 to 85 parts of extender. For such sprays as are water emulsions the glycol is preferably formulated as a concentrate containing from 1 to 10 parts by weight of emulsifying agent to from 99 to 90 parts of glycol, from 4 to 15 parts of the concentrate to be used with sufficient water to make a total of 100 parts. As previously stated, it is preferred to use no more emulsifying agent than is necessary to keep the glycol in suspension during spraying but, for any given emulsifying agent, the necessary amount will vary slightly depending upon the type of spraying apparatus used. Where the apparatus continuously mixes the composition, less emulsifying agent will maintain the emulsion than where the composition is not continually stirred.

*Example 4.*—For use on humans, the glycol may be applied in undiluted form or diluted with varying amounts of ethanol or isopropanol up to 60 parts by weight of the alcohol to 40 parts of the glycol. The use of such a solution facilitates the application of the glycol and gives a thinner coating of the glycol on the skin when the alcohol evaporates; and the evaporation of the alcohol produces a cooling effect on the skin. Where the solution contains other repellents, for instance 2-ethylhexanediol or the other repellents referred to in the Wilkes patent, or dimethyl or dibutyl phthalate, or n-butyl mesityl oxide oxalate, the amount of glycol may be reduced to as little as 5 parts by weight of the total mix. Solutions containing the glycols contemplated herein do not creep as readily as does, for instance, dimethyl phthalate and when used on animals or humans do not collect as readily on the underside of the animal or at the extremities of the limbs of humans.

Tests against the Adirondack black fly, *Prosimulium hirtipes*, and the white-stockinged black fly, *Simulium venustum*, and midges, Culicoides, were conducted in the vicinity of Fabyan, New Hampshire, during June at the height of the season for these insects. In conducting the tests, undiluted 250 viscosity glycol was applied to the head and face, and bare arms and legs, at the dosage of 1 cc. per 100 square inches of skin area, as nearly as could be determined, by taking the glycol in the hands and rubbing it on the exposed parts of the body. Typical data are presented in the following Table 3.

*Table 3*

| Treated Area | Protection Time in Minutes | |
|---|---|---|
| | Black Flies | Midges |
| Head and face | [1] 140 | |
| Arm | [1] 285 | [1] 285 |
| Arm | 600 | 500 |
| Leg | 300 | |
| Check—no treatment | Bites on head—face area, arms and legs within one minute. | |

[1] No bites received at this number of minutes whereupon a strong wind developed which dispelled the insects.

*Example 5.*—Clothing may be treated by applying the undiluted glycol by hand, or the clothing or head nets may be treated by soaking in an aqueous emulsion or a solution of the glycol in a volatile diluent, for instance ethanol, isopropanol, acetone or dry cleaning fluids such as carbon tetrachloride or naphtha and the like. The amount of glycol is such that the cloth contains from 10% to 20% of the glycol based on the weight of the cloth. Thus where the glycol is used with an extender, that is in the form of a water emulsion or in the form of a solution, the amount of glycol in the emulsion or solution is such that when the cloth is saturated with the preparation and the extender has dissipated, the cloth contains up to 20% by weight of the glycol. The clothing is not noticeably oily but is insect repellent, particularly to black flies, midges and the like, where it contains from 10% up to about 20% by weight of the glycol.

*Example 6.*—A house spray for knocking down and killing house flies comprises pyrethrins, the glycol and the usual deodorized kerosene-type petroleum oil. The glycol is an activator for the pyrethrins both in knock-down and kill, as shown by the following tables 4, 5, and 6 based on results of a series of Peet-Grady[1] tests against the common house fly, *Musca domestica* L.

Table 4

| Mg. Pyrethrins per 100 cc. of spray | Parts by vol. of 250 vis. glycol, based on total vol. (100 cc.) of spray | Percent Knock-down, 10 minutes | Percent Kill, 24 hours | O. T. I. difference | Grade Spray |
|---|---|---|---|---|---|
| 100 (O. T. I.)[1] | 0 | 98.3 | 57.5 | | B. |
| 50 | 2.5 | 98.1 | 59.8 | +2 | B. |
| 50 | 5 | 98.5 | 65.8 | +8 | A. |
| 50 | 10 | 96.9 | 78.7 | +21 | AA. |
| 0 | 10 | 59.7 | 37.6 | −22 | B−. |
| 30 | 10 | 97.2 | 67.6 | +10 | A. |
| 40 | 10 | 97.2 | 65.1 | +7 | A. |
| 60 | 10 | 98.8 | 84.1 | +26 | AA. |

[1] Peet-Grady method; official method of the National Association of Insecticide and Disinfectant Manufacturers, Inc. for evaluating liquid household insecticides; Blue Book (MacNair-Dorland Co., N. Y.) 1939: 177, 179, 181-183.

In another series of Peet-Grady tests, the following results were obtained.

Table 5

| Mg. Pyrethrins per 100 cc. of spray | Parts by vol. of 250 vis. glycol, based on total vol. (100 cc.) of spray | Percent Knock-down, 10 minutes | Percent Kill, 24 hours |
|---|---|---|---|
| 25 | 0 | 89.2 | 18.6 |
| 6.25 | 0 | 41.7 | 14.7 |
| 1.56 | 0 | 24.3 | 4.7 |
| 25 | 10 | 94.7 | 55.0 |
| 6.25 | 10 | 86.6 | 33.0 |
| 1.56 | 10 | 51.1 | 35.7 |
| 100 (O. T. I.) | | 98.4 | 42.5 |

[1] "O. T. I." indicates the Official Test Insecticide (cf. Blue Book) prepared by the National Association of Insecticide and Disinfectant Manufacturers, Inc. each year.

In another series of Peet-Grady tests, the following results were obtained.

Table 6

| Mg. Pyrethrins per 100 cc. of spray | Parts by vol. of glycol based on total volume (100 cc.) of spray | Percent Knock-down, 10 minutes | Percent Kill, 24 hours |
|---|---|---|---|
| | 100 vis. | | |
| 6.25 | 10 | 92.5 | 51.5 |
| 6.25 | 5 | 78.4 | 40.0 |
| 6.25 | 2.5 | 79.8 | 39.5 |
| | 250 vis. | | |
| 6.25 | 10 | 79.7 | 41.8 |
| 6.25 | 5 | 86.0 | 47.9 |
| 6.25 | 2.5 | 76.6 | 41.6 |
| | 400 vis. | | |
| 6.25 | 10 | 53.4 | 36.4 |
| 6.25 | 5 | 59.1 | 35.2 |
| 6.25 | 2.5 | 55.4 | 36.9 |
| 6.25 | 0 | 45.5 | 8.7 |
| 100 (O. T. I.) | 0 | 97.6 | 47.8 |

These tests represent a variation in the glycol-pyrethrin proportions of approximately 5% to 160% of glycol based on the pyrethrins in the units given. The specific gravity of the 250 viscosity glycol was 0.990 at $$\frac{20° \text{C.}}{20° \text{C.}}$$

and the specific gravities of the 100 viscosity and the 400 viscosity glycol are substantially the same, all being so close to 1.0 that volume and weight c. g. s. units are generally considered to be equivalents. The livestock sprays of Examples 1, 2, and 3 may also contain pyrethrins in these proportions based on the glycol. Also any of the compositions described herein may be used as sprays with or without pyrethrins, for instance in barns and other buildings. The sprays used in milking rooms preferably contain pyrethrins for the immediate knock-down and the kill. The addition of the glycol to the pyrethrin sprays reduces the amount of pyrethrins required or increases the activity of the pyrethrins; and the glycol introduces into the spray no property directly toxic to the animals or humans, or indirectly toxic to the animals through their food or indirectly to humans through the milk, milk products, or flesh of the animals.

*Example 7.*—For use as a killing agent against mite species, for instance: greenhouse red spider mites, *Tetranychus telarius*, *T. altheae*, *T. bimaculatus*, European red mite, *Paratetranychus pilosus*, and others, suitable compositions contain the glycol, water and a wetting agent, in the proportions of from 0.06 part to 2 parts of the glycol, from 0.015 part to 0.40 part of wetting agent and sufficient water to make 100 parts, all parts by volume. For miticides on plants in foliage, the composition contains from 0.06 part to 0.5 part of a glycol having a viscosity of from 200 to 850 Saybolt Universal seconds at 100° F., from 0.015 part to 0.25 part of a wetting agent, and sufficient water to make 100 parts, all parts by volume. For miticides on dormant vegetation, the composition contains from 1 part to 2 parts of a glycol having a viscosity of from 200 to 850 Saybolt Universal seconds at 100° F., from 0.06 to 0.4 part of wetting agent and water to make 100 parts. Any of the previously mentioned wetting agents may be used; they are not only wetting agents but in the case of the butoxy polypropylene glycols are also emulsifying agents, penetrating agents and spreading agents and are particularly valuable for this reason.

The following Table 7 shows the results of laboratory tests against red spider mites, *Tetranychus telarius*, on tendergreen bean plants infested with the mites. The treatment was spraying infested plants with the compositions shown, under identical conditions and with sufficient spray to wet the plants and insects, then transferring the plants to an insect culture room where the temperature was maintained at 80° F.±1° F., relative humidity of 50%±5%, and fluorescent light simulating daylight. This test is more favorable to the survival of the mites than average greenhouse conditions where temperature, humidity and light conditions may vary considerably and higher humidity combined with little light, and low temperature are, of themselves, conducive to mortality. Untreated infested check plants were also maintained in the culture room. After four days, the living and dead adult mites and eggs on all plants were determined by count. The percent control for adults and eggs given on Table 7 is calculated according to the formula Percent control =

$$\frac{(\text{percent living on check} - \text{percent living on treated})}{\text{percent living on check}} \times 100$$

The compositions sprayed were prepared by mixing, by volume, 0.05 part of Triton X-155 as a representative wetting agent, a butoxy polypropylene glycol of the viscosity and in the amount indicated in the first column of the table and then mixing with sufficient water to make 100 parts by volume. At the time that the count of mites and eggs was made, the condition of the plant was noted, as a pesticidal composition is no good for use on plants in foliage if it injures the plant too severely even though it kills the pests. The phytotoxic ratings given in Table 7 and succeeding tables are:

A=no plant injury
B=slight plant injury
C=severe plant injury
D=partial defoliation
E=complete defoliation—kills the plant.

Table 7

| Treatment | Phytotoxicity Rating | Percent Control, Adults | Percent Control, Eggs |
|---|---|---|---|
| Glycol: | | | |
| 100 viscosity— | | | |
| 0.125 part | A | 93 | 100 |
| 0.06 part | A | 87 | 95 |
| 175 viscosity— | | | |
| 0.125 part | A | 87 | 90 |
| 0.06 part | A | 82 | 100 |
| 250 viscosity— | | | |
| 0.125 part | A | 93 | 89 |
| 0.06 part | A | 76 | 79 |
| 400 viscosity— | | | |
| 0.125 part | A | 100 | 100 |
| 0.06 part | A | 96 | 90 |
| 850 viscosity— | | | |
| 0.125 part | A | 98 | 67 |
| 0.06 part | A | 85 | 67 |
| Untreated check | A | 10 | 0 |

Similar tests on mites were run using the 250 viscosity butoxy polypropylene glycol but varying the wetting agents and varying the amount of both wetting agent and glycol. The results are shown on the following Table 8. In the first column of Table 8, "W. A. X." indicates the sodium salt of 5,11-diethyl pentadecyl-8-sulfate used as a wetting agent, "W. A. Z." indicates sodium lauryl sulfate used as a wetting agent, and the figures are the parts by volume of the 250 viscosity glycol and wetting agent which were mixed and then mixed with sufficient water to give 100 parts by volume, to form the compositions sprayed on the bean plants infested with the mites. The headings of, and the figures in, the second, third and fourth columns of Table 8 have the significance of those of Table 7.

Table 8

| Treatment | Phytotoxicity Rating | Percent Control, Adults | Percent Control, Eggs |
|---|---|---|---|
| Glycol, 0.5 part<br>W. A. X., 0.125 part | A | 100 | 100 |
| Glycol, 0.5 part<br>W. A. Z., 0.125 part | A | 91 | 90 |
| Glycol, 0.25 part<br>W. A. X., 0.125 part | A | 100 | 100 |
| Glycol, 0.25 part<br>W. A. Z., 0.125 part | A | 96 | 82 |
| Glycol, 0.25 part<br>W. A. X., 0.06 part | A | 96 | 92 |
| Glycol, 0.125 part<br>W. A. X., 0.03 part | A | 88 | 82 |

The following Table 9 shows the significance of using butoxy polypropylene glycols of varying viscosities. The tests were conducted with red spider mites on bean plants in the manner described for Table 7. The compositions used for the tests shown on Table 9, were prepared by mixing, by volume, 0.05 part of Triton X–155 as a typical wetting agent, the butoxy polypropylene glycol of the viscosity and in the amount shown in the first column of the table, and then mixing with sufficient water to give 100 parts by volume.

The second, third, and fourth columns of Table 9 have the significance of the corresponding columns of Table 7.

Table 9

| Treatment | Phytotoxicity Rating | Percent Control, Adults | Percent Control, Eggs |
|---|---|---|---|
| Butoxy polypropylene glycol: | | | |
| Viscosity 65, 0.06 part | A | 29 | 5 |
| Viscosity 85, 0.125 part | A | 25 | 0 |
| Viscosity 85, 0.06 part | A | 14 | 0 |
| Viscosity 100, 0.125 part | A | 93 | 100 |
| Viscosity 100, 0.06 part | A | 87 | 95 |
| Viscosity 175, 0.125 part | A | 87 | 90 |
| Viscosity 175, 0.06 part | A | 82 | 100 |
| Viscosity 250, 0.125 part | A | 93 | 89 |
| Viscosity 250, 0.06 part | A | 76 | 79 |
| Viscosity 400, 0.125 part | A | 100 | 100 |
| Viscosity 400, 0.06 part | A | 96 | 90 |
| Viscosity 850, 0.125 part | A | 98 | 67 |
| Viscosity 850, 0.06 part | A | 85 | 67 |
| Viscosity 1,339, 0.125 part | A | 44 | 0 |
| Viscosity 1,339, 0.06 part | A | 47 | 26 |

The relations between viscosities and other properties of the butoxy polypropylene glycols, as used herein, are:

| Viscosity at 100° F., S. U. S. | Molecular Weight | Vapor Pressure, mm. Hg, 30° C. | Solubilities—30° C., Weight Percent | |
|---|---|---|---|---|
| | | | Water in | In Water |
| 65 | 300 | $1 \times 10^{-2}$ | 6.0 | 0.4 |
| 100 | 400 | $<1 \times 10^{-2}$ | 5.5 | 0.2 |
| 250 | 800 | $1 \times 10^{-3}$ | 4.5 | 0.1 |
| 400 | 1,200 | $<1 \times 10^{-3}$ | 3.5 | 0.01 |
| 850 | 2,200 | $1 \times 10^{-4}$ | 2.0 | $<0.01$ |

The following Table 10 gives the results of tests on greenhouse red spider, using various glycols other than butoxy polypropylene glycols having viscosities between 100 and 850. The tests were made as described for Table 7. The compositions tested were prepared by mixing, by volume, 0.05 part of Triton X–155 with the glycols and amount thereof shown in the first column of Table 10, and then mixing with sufficient water to give 100 parts of volume. The second, third, and fourth columns of Table 10 have the significance of the corresponding columns of Table 7.

Table 10

| Treatment | Phytotoxicity Rating | Percent Control, Adults | Percent Control, Eggs |
|---|---|---|---|
| Butoxy polyethylene glycol: | | | |
| Viscosity 141, 0.125 part | A | 12 | 12 |
| Viscosity 141, 0.06 part | A | 0 | 0 |
| Methoxy polypropylene glycol: | | | |
| Viscosity 202, 0.125 part | A | 46 | 17 |
| Viscosity 202, 0.06 part | A | 33 | 0 |
| Isopropoxy polypropylene glycol: | | | |
| Viscosity 236, 0.125 part | A | 33 | 0 |
| Viscosity 236, 0.06 part | A | 33 | 0 |
| 2-ethylhexoxy polypropylene glycol: | | | |
| Viscosity 250, 0.125 part | A | 51 | 46 |
| Viscosity 250, 0.06 part | A | 42 | 33 |
| Benzyloxy polypropylene glycol: | | | |
| Viscosity 176, 0.125 part | A | 45 | 2 |
| Viscosity 176, 0.06 part | A | 23 | 0 |
| Vinyloxy polypropylene glycol: | | | |
| Viscosity 80, 0.125 part | A | 46 | 14 |
| Viscosity 80, 0.06 part | A | 10 | 5 |
| Viscosity 400, 0.125 part | A | 30 | 28 |
| Viscosity 400, 0.06 part | A | 22 | 0 |
| Amyl thioether of polypropylene glycol: | | | |
| Viscosity 127, 0.125 part | A | 19 | 9 |
| Viscosity 127, 0.06 part | A | 17 | 3 |
| Dipropylene glycol polypropylene glycol: | | | |
| Viscosity 325, 0.125 part | A | 47 | 16 |
| Viscosity 325, 0.06 part | A | 41 | 5 |
| Viscosity 753, 0.125 part | A | 74 | 0 |
| Viscosity 753, 0.06 part | A | 43 | 0 |
| Viscosity 1,640, 0.125 part | A | 47 | 15 |
| Viscosity 1,640, 0.06 part | A | 32 | 10 |
| Untreated (check) | A | 14 | 0 |
| Water containing 0.05% of Triton X–155 | A | 13 | 0 |

The butoxy polypropylene glycols may be prepared by the methods disclosed in the U. S. patent application of Fife and Roberts, Serial No. 538,098, filed May 30, 1944, now Patent No. 2,448,664, dated September 7, 1948.

For fly repellents, the preferred butoxy polypropylene glycols have viscosities between 100 and 300. Glycols of higher viscosity may be used but they are no more effective than those of the 100–300 viscosity range and the extra propylene oxide units represent extra cost. The glycols of maximum effectiveness lie in the viscosity range between 100 and 250; and of these, glycols of approximately 100 viscosity are preferred as containing less propylene oxide units. Fly repellent compositions for use on livestock preferably contain between 5 and 10 parts by weight or volume of the glycols with from 95 to 90 parts of extender. The extender may be any livestock oil which is a solvent for the glycol. Preferably, for low cost the extender is water; and an emulsifying agent is a component of the composition so that a water emulsion containing the glycol may be applied. Stock sprays may contain a killing agent or a knock-down agent or both, for instance DDT and pyrethrins. The DDT is primarily a killing agent and may be used in amounts from 10 parts to 20 parts by weight per 100 parts by weight of the glycol or in amounts from 1 part to 2 parts by weight per 100 parts by weight of spray composition. The pyrethrins are both knock-down and killing agents. The preferred concentrates contain from 60 to 2500 milligrams of pyrethrins per 100 grams of 100 to 250 viscosity glycol, and the spray preferably contains from 6 to 50 mg. of pyrethrins, from 2 to 10 gms. of glycol, and sufficient extender to make 100 grams. The extender may be a solvent for the DDT, the pyrethrins and the glycol or a solvent for only one or two constituents or for none. Where the extender, for instance water, is a non-solvent for one or all of the concentrate ingredients, the concentrate preferably contains from 1 to 10% by weight of emulsifying agent based upon the total weight of the concentrate. The preferred addends are soluble in the glycols, as are DDT and pyrethrins.

For miticides, the preferred butoxy polypropylene glycols have viscosities between 200 and 850. The glycols of maximum effectiveness lie in the viscosity range between 200 and 400. The extender is preferably water. Substantially any emulsifier may be used to hold the glycol in suspension although the sodium salt of 5,11-diethyl pentadecyl-8-sulfate is particularly effective. The miticide concentrate preferably contains from 5 to 20% by weight of emulsifying agent based on the total weight of the concentrate. In all of the preferred emulsions the emulsifying agent is soluble in the glycol so that the concentrate is a liquid. The concentrates may also contain other insecticidal, bactericidal and fungicidal agents, for instance a mineral oil. For foliage sprays the oil should be "light" to "medium" and for dormant sprays the oil may be "heavy." A "light" oil has a viscosity between 40 and 65 Saybolt Universal seconds at 100° F. and a "medium" oil has a viscosity between 65 and 85, both having an unsulfonatable residue from about 90 to 98 per cent. A "heavy" oil has a viscosity higher than 85 and an unsulfonatable residue from about 70 to 90 per cent. Sprays for vegetation in foliage may contain from 0.06 to 0.5% by weight of the glycol with or without from about 0.5% to 1.20% by weight of a light to medium oil, based on the total weight of the spray but the total weight of glycol plus oil should not exceed about 1.25% of the weight of the spray. Sprays for dormant vegetation may contain from 0.5 to 3% by weight of the glycol with or without from about 2% to 5% by weight of a heavy oil, based on the total weight of the spray but the total weight of glycol plus oil should not exceed about 5% of the weight of the spray. The concentrates may be prepared with the proper proportions of glycol and oil and sufficient emulsifying agent, as previously stated, to yield these sprays as emulsions upon stirring with sufficient water to make 100 parts by weight.

What is claimed is:

1. Method of protecting a living organism against insects which comprises placing between said organism and the insects of a film composed essentially of a monobutoxy polypropylene glycol having a viscosity between 100 and 850 Saybolt Universal seconds at 100° F.

2. Method of protecting a living organism against insects which comprises placing between said organism and the insects a film composed essentially of a monobutoxy polypropylene glycol having an average molecular weight between 400 and 2200.

3. Method of protecting a living organism against insects which comprises placing between said organism and the insects a film composed essentially of a monobutoxy polypropylene glycol of the formula

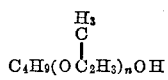

where the average value of "$n$" is between 6 and 35.

4. Method of protecting a living organism against flies which comprises placing between said organism and the flies a film composed essentially of a monobutoxy polypropylene glycol having a viscosity between 100 and 300 Saybolt Universal seconds at 100° F.

5. Method of protecting a living organism against mites which comprises placing between said organism and the mites a film composed essentially of a monobutoxy polypropylene glycol having a viscosity between 200 and 850 Saybolt Universal seconds at 100° F.

6. Method of protecting a living organism against mites which comprises placing between said organism and the mites a film composed essentially of a monobutoxy polypropylene glycol having a viscosity between 200 and 400 Saybolt Universal seconds at 100° F.

7. Method of protecting a living organism against insects which comprises placing between said organism and the insects a film composed essentially of a monobutoxy polypropylene glycol having a viscosity between 200 and 300 Saybolt Universal seconds at 100° F.

8. Composition for protection of a base against insects comprising a monobutoxy polypropylene glycol having a viscosity between 100 and 850 Saybolt Universal seconds at 100° F., an emulsifying agent and an insecticide.

9. Composition for protection of a base against insects comprising a monobutoxy polypropylene glycol having a viscosity between 100 and 850 Saybolt Universal seconds at 100° F. and pyrethrins.

10. Composition for protection of a base against insects comprising a monobutoxy polypropylene glycol having a viscosity between 100 and 850 Saybolt Universal seconds at 100° F., an emulsifying agent and DDT.

11. Composition for protection of a base against insects comprising a monobutoxy polypropylene glycol having a viscosity between 100 and 850 Saybolt Universal seconds at 100° F. and an emulsifying agent.

12. Composition for protection of a base against insects comprising a monobutoxy polypropylene glycol having a viscosity between 100 and 850 Saybolt Universal seconds at 100° F. and an emulsifying agent containing combined sulfur.

13. Composition for protection of a base against insects comprising a monobutoxy polypropylene glycol having a viscosity between 100 and 850 Saybolt Universal seconds at 100° F. and the sodium salt of 5,11-diethyl pentadecyl-8-sulfate.

14. Composition for protection of a base against insects and fungi comprising a monobutoxy polypropylene glycol having a viscosity between 100 and 850 Saybolt Universal seconds at 100° F. as an insectide, an emulsifying agent and 2-heptadecyl glyoxalidine as an insectide and fungicide.

15. Composition for protection of a base against insects comprising a monobutoxy polypropylene glycol having a viscosity between 100 and 850 Saybolt Universal seconds at 100° F., a mineral oil, an emulsifying agent and water.

16. Composition for protection of a base against insects comprising a monobutoxy polypropylene glycol having a viscosity between 100 and 850 Saybolt Universal seconds at 100° F., a mineral oil having a viscosity no lower than 40 Saybolt Universal seconds at 100° F. and an unsulfonatable residue no lower than 70%, water and an emulsifying agent; the total weight of glycol plus oil being between 0.56% and 5% of the total weight of the composition.

17. Concentrate adapted for mixture with a carrier comprising a monobutoxy polypropylene glycol having a viscosity between 100 and 850 Saybolt Universal seconds at 100° F., a mineral oil and an emulsifying agent.

18. Concentrate adapted for mixture with a carrier comprising from 70 parts to 99 parts of a monobutoxy polypropylene glycol having a viscosity between 100 and 850 Saybolt Universal seconds at 100° F. and from 30 parts to 1 part of an emulsifying agent.

RICHARD H. WELLMAN.
RAYMOND W. McNAMEE.

References Cited in the file of this patent

UNITED STATES PATENTS

| Number | Name | Date |
|---|---|---|
| 2,293,255 | Granett | Aug. 18, 1942 |
| 2,407,205 | Wilkes | Sept. 3, 1946 |
| 2,448,664 | Fife et al. | Sept. 7, 1948 |

OTHER REFERENCES

De Ong: "Chemistry and Uses of Insecticides," Reinhold Publishing Corporation, New York (1948), pages 123 to 131.

Morton et al.: Committee on Medical Research of the Office of Scientific Research and Development, OSRD Insect Control Committee Report Number 16, Interim Report #0-87. February 1, 1945; OEMcmr-M-4331, section 1, pages 1, 2, 78.

Wadley: U. S. D. A. Bureau of Entomology and Plant Quarantine Report ET-223, June 1945, pages 1 to 6.

Linduska et al.: Jr. Econ. Entom., volume 39, Number 5 (December 1946), pages 767 to 769.